United States Patent
Ge et al.

(10) Patent No.: US 7,495,843 B2
(45) Date of Patent: Feb. 24, 2009

(54) FOCUS ADJUSTING MECHANISM AND PORTABLE ELECTRONIC DEVICE USING SAME

(75) Inventors: Peng-Jin Ge, Shenzhen (CN); Geng-Hui Guo, Shenzhen (CN); Ye Liu, Shenzhen (CN); Jun Wang, Shenzhen (CN); Hsiao-Hua Tu, Taipei Hsien (TW); Chia-Hua Chen, Taipei Hsien (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/616,828

(22) Filed: Dec. 27, 2006

(65) Prior Publication Data
US 2007/0223110 A1    Sep. 27, 2007

(30) Foreign Application Priority Data
Mar. 25, 2006    (CN)    ............... 2006 1 0034744

(51) Int. Cl.
G02B 15/14    (2006.01)
G02B 7/02    (2006.01)
G02B 17/00    (2006.01)

(52) U.S. Cl. .............. 359/699; 359/819; 359/822; 396/76

(58) Field of Classification Search ......... 359/694–701, 359/819–823; 396/72, 76, 85, 86, 131
See application file for complete search history.

(56) References Cited

U.S. PATENT DOCUMENTS 6,002,886 A * 12/1999 Tamura ............... 396/76
6,204,979 B1 * 3/2001 Matsui ............... 359/819
6,449,430 B1 * 9/2002 Tasaka et al. ........... 396/6

FOREIGN PATENT DOCUMENTS

CN    1154491 A    7/1997

* cited by examiner

Primary Examiner—Mohammed Hasan
(74) Attorney, Agent, or Firm—Steven M. Reiss (57) ABSTRACT

A focus adjusting mechanism (50) for use in a portable electronic device (100) with a lens module (40) is provided. The lens module includes a lens barrel (42) and a lens barrel holder (44). The lens barrel is threaded into the barrel holder. The focus adjusting mechanism includes a driving member (52), a follower (54) and a transmission rod (56). The driving member has a plurality of circumferential teeth (5242) formed thereon. The follower has a plurality of linear teeth (5472) formed thereon. The linear teeth engage with the circumferential teeth for transforming the rotation of the driving member to the linear movement of the follower. The transmission rod is disposed between the follower and the lens barrel to transform the linear movement of the follower into the rotation movement of the lens barrel relative to the lens barrel holder.

15 Claims, 6 Drawing Sheets

FOCUS ADJUSTING MECHANISM AND PORTABLE ELECTRONIC DEVICE USING SAME

BACKGROUND OF THE INVENTION

1. Field of the Invention

The present invention relates generally to focus adjusting mechanisms and, more particularly, to a focus adjusting mechanism for use in a portable electronic device.

2. Description of Related Art

With the development of technology, portable electronic devices for imaging such as digital cameras and mobile phones with lens modules have all entered widespread use. The lens module is equipped with a focus adjusting mechanism used to capture images of objects with different distances.

Figure 1:
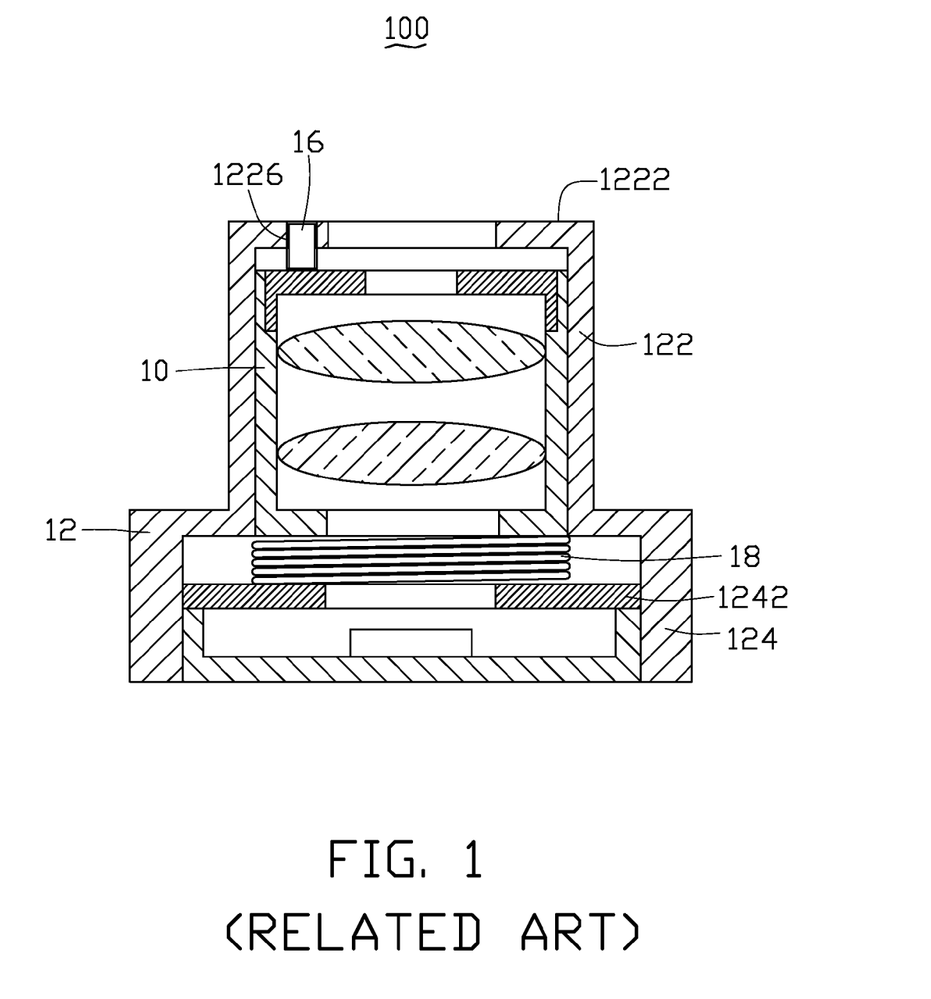
FIG. 1 is a cross-sectional view of a typical focus adjusting mechanism for a lens module.

A typical focus adjusting mechanism for a lens module 100 is shown in FIG. 1. The lens module 100 includes a lens barrel 10 and a lens barrel holder 12. The lens barrel holder 12 includes a first barrel portion 122 and a second barrel portion 124. The first barrel portion 122 defines an open end 1222, and further defines a screw hole 1226 through the open end 1222. The second barrel portion 124 has a plate 1242 formed therein. The focus adjusting mechanism includes a screw 16 and a spring 18. When assembled, the lens barrel 10 engages into the first barrel portion 122, and can move relative to the first barrel portion 122. The screw 16 engages through the screw hole 1226 to resist one end of the lens barrel 10. The spring 18 is held between the lens barrel 10 and the plate 1242, resisting the other end of the lens barrel 10. In use, the screw 16 is operated to enable the lens barrel 10 to move axially relative to the lens barrel holder 12.

The above focus adjusting mechanism can precisely adjust the focal length of the lens module 100. However, the spring 18 of the focus adjusting mechanism has a relatively short service-life. In addition, when the spring 18 doesn't work, the precise adjustment of the focus adjusting mechanism may be disenabled, and while operating the screw 16 manually, incident light may be blocked.

What is needed, therefore, is a focus adjusting mechanism that can overcome the above-mentioned shortcomings.

SUMMARY OF THE INVENTION

In one embodiment thereof, a focus adjusting mechanism for use in a portable electronic device with a lens module is provided. The lens module includes a lens barrel and a lens barrel holder. The lens barrel is threaded into the barrel holder. The focus adjusting mechanism includes a driving member, a follower and a transmission rod. The driving member has a plurality of circumferential teeth formed thereon. The follower has a plurality of linear teeth formed thereon. The linear teeth engage with the circumferential teeth to transform the rotation of the driving member to the linear movement of the follower. The transmission rod is disposed between the follower and the lens barrel to transform the linear movement of the follower into the rotation of the lens barrel relative to the lens barrel holder.

A portable electronic device is provided including a lens module, a focus adjusting mechanism, an upper shell portion and a lower shell portion. The lower shell portion is attached to upper shell to enclose the functioning mechanism and the lens module. The lens module includes a lens barrel and a lens barrel holder. The lens barrel is threaded into the barrel holder. The focus adjusting mechanism includes a driving member, a follower and a transmission rod. The driving member has a plurality of circumferential teeth formed thereon. The follower has a plurality of linear teeth formed thereon. The linear teeth engage with the circumferential teeth to transform the rotation of the driving member to the linear movement of the follower. The transmission rod is disposed between the follower and the lens barrel to transform the linear movement of the follower into the rotation of the lens barrel relative to the lens barrel holder.

Other advantages and novel features will become more apparent from the following detailed description when taken in conjunction with the accompanying drawings.

BRIEF DESCRIPTION OF THE DRAWINGS

Many aspects of the focus adjusting mechanism and portable electronic device using the same can be better understood with reference to the following drawings. These drawings are not necessarily drawn to scale, the emphasis instead being placed upon clearly illustrating the principles of the present focus adjusting mechanism and portable electronic device using the same. Moreover, in the drawings like reference numerals designate corresponding parts throughout the several views.

DETAILED DESCRIPTION OF PREFERRED EMBODIMENTS

The present focus adjusting mechanism is suitable for portable electronic devices such as mobile phones, digital cameras, and so on.

Figure 2:
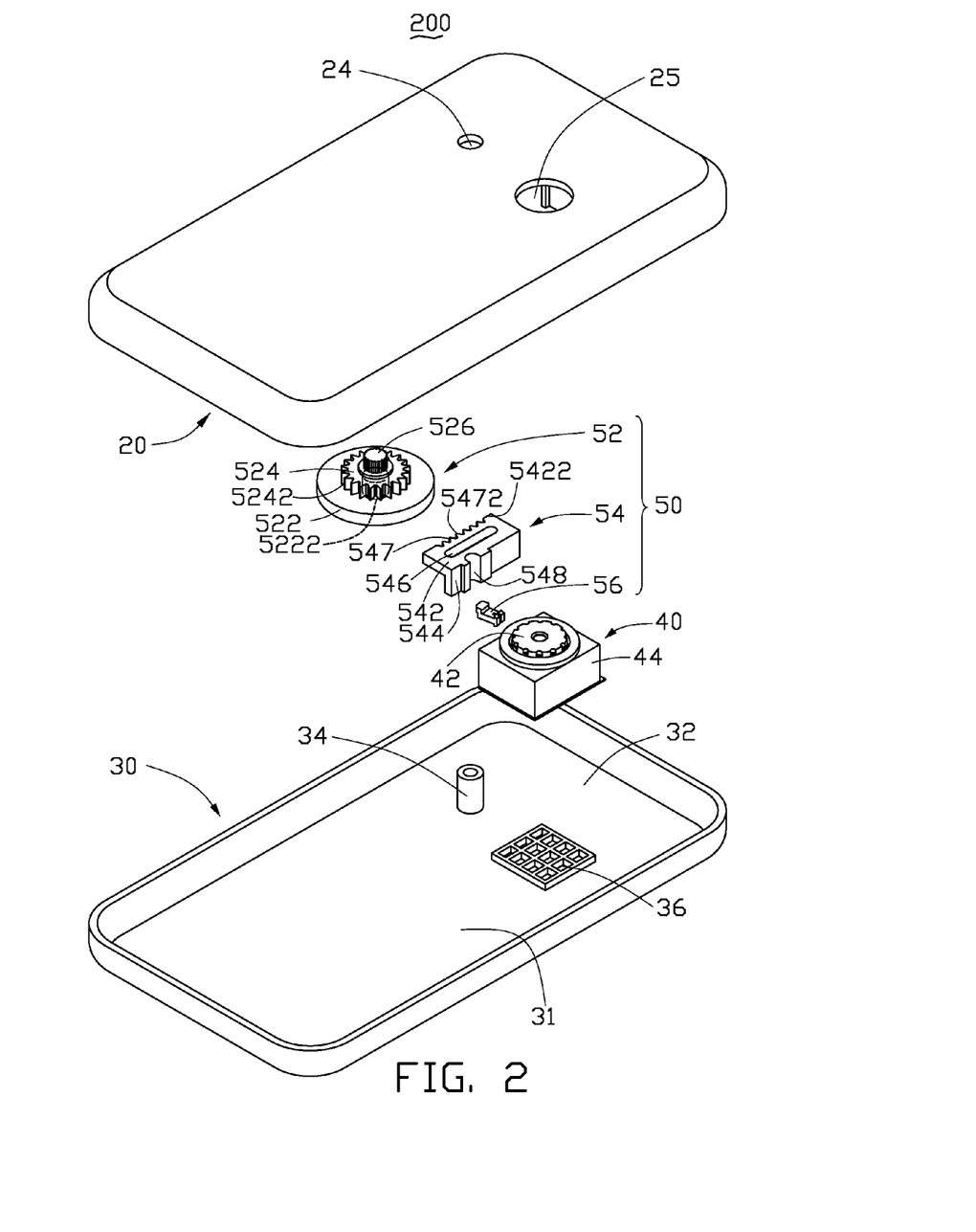
FIG. 2 is an exploded, isometric view of a focus adjusting mechanism used in a digital camera in accordance with a preferred embodiment of the present invention.

Referring to the drawings in detail, FIG. 2 shows an exemplary preferred digital camera 200 equipped with a focus adjusting mechanism 50. The exemplary digital camera 200 further includes an upper shell portion 20, a lower shell portion 30 and a lens module 40. The lens module 40 includes a lens barrel 42 and a lens barrel holder 44, and the focus adjusting mechanism 50 functions to adjust a position of the lens barrel 42 within the lens barrel holder 44.

Figure 3:
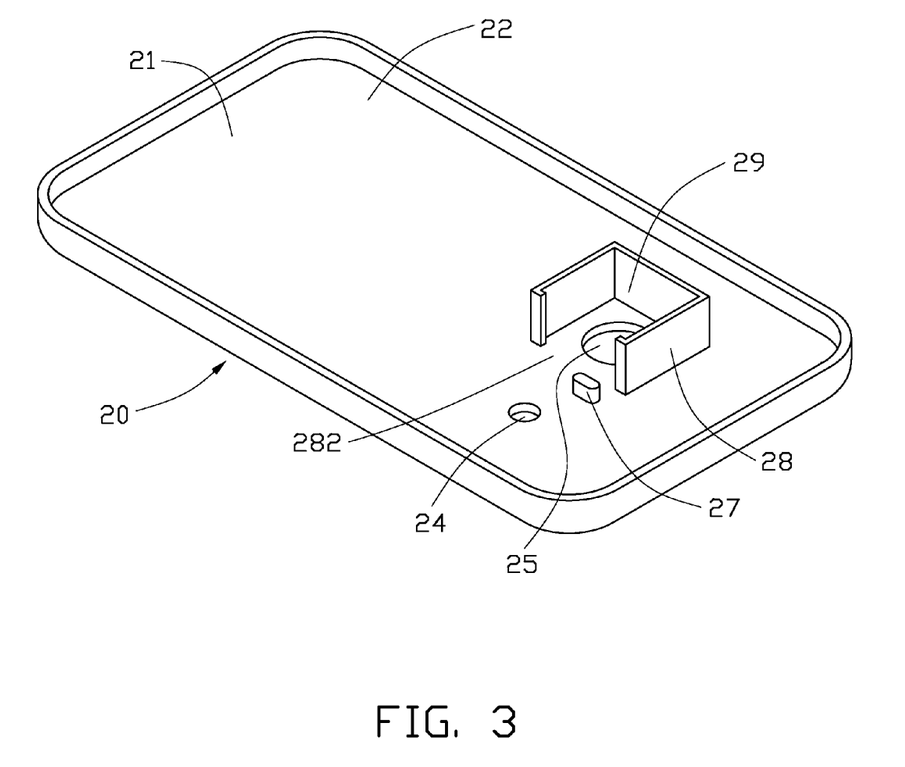
FIG. 3 is an enlarged, isometric view of an upper shell shown in FIG. 2, showing another aspect of the upper shell.

Referring also to FIG. 3, the upper shell portion 20 includes an upper wall 21 and four adjacent sidewalls (not labeled), which cooperatively define an upper cavity 22. The upper wall 21 has a through hole 24 and a light-guiding hole 25 defined therethrough, and also has a guide block 27 and a semienclosed wall 28 with an open end 282 formed thereon. The through hole 24 is defined in alignment with the light-guiding hole 25, and the through holes 24 and the light-guiding hole 25 are spaced by a distance. The guide block 27 is located between the through hole 24 and the light-guiding hole 25, and is received in the upper cavity 22. The semienclosed wall 28 defines a generally rectangular receiving space 29 used to receive the lens module 40. The semienclosed wall 28 is disposed around the light-guiding hole 25 and is received in the upper cavity 22, while the open end 282 faces the guide block 27 and is separated by a gap from the guide block 27.

The lower shell portion 30 (best shown in FIG. 2) has an essentially identical size as the upper shell portion 20 so as to enclose the focus adjusting mechanism 50 and the lens module 40. The lower shell portion 30 includes a lower wall 31 and four adjacent sidewalls (not labeled), which cooperatively define a lower cavity 32. The lower wall 31 has a cylindrical column 34 and a positioning block 36 formed thereon. The cylindrical column 34 is received in the lower cavity 32. The cylindrical column 34 is located at a specific place so that an axis of the cylindrical column 34 aligns with an axis of the through hole 24 when the upper and lower shell portions 20, 30 are assembled together. The positioning block 36 functions to attach the lens module 40 thereon. The positioning block 36 may have various kinds of shape and structure, and may have various kinds of means of attaching to the lens module 40. In this preferred embodiment, the positioning block 36 is a square block with a same shape and size as the lens barrel holder 44, and glues the lens module 40. The positioning block 36 is received in the lower cavity 32, and is located at a specific place so as to allow the positioning block 36 to align with the receiving space 29 when the upper and lower shell portions 20, 30 are assembled together.

Figure 4:
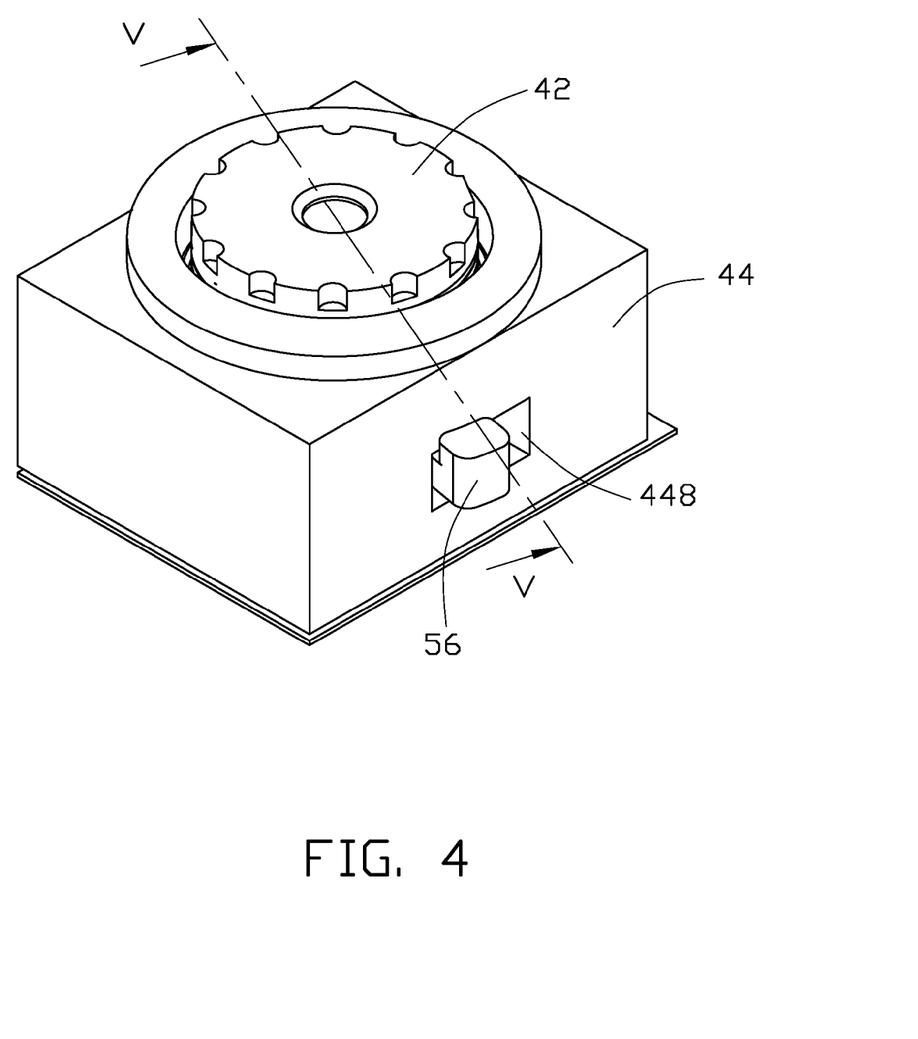
FIG. 4 is an assembled view of a lens module and a transmission rod shown in FIG. 2.
Figure 5:
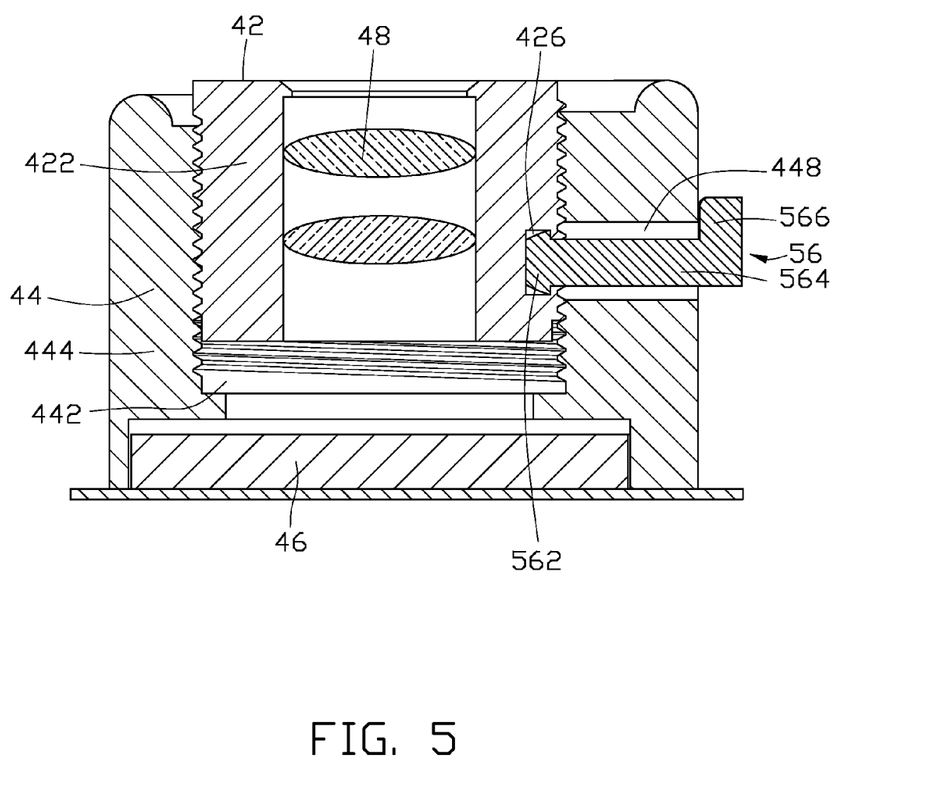
FIG. 5 is a cross-sectional view of the assembled lens module with the transmission rod taken along V-V lien in FIG. 4.

Referring also to FIGS. 4 and 5, the lens module 40 further includes an image sensor 46 and a plurality of lenses 48. The image sensor 46 is securely held within the lens barrel holder 44, being located beneath the lens barrel 42 when the lens barrel 42 is assembled together with the lens barrel holder 44. The lens barrel 42 of the lens module 40 is generally a hollow cylinder, and the lenses 48 are securely held within the lens barrel 42. The lens barrel 42 includes a first threaded body 422 with an exterior thread formed thereon. The first threaded body 422 has a stepped groove 426 defined therein with an open end exposing to outside. The lens barrel holder 44 of the lens module 40 is generally cube-like, and has an aperture 442 defined therethrough. The aperture 442 is used to receive the lens barrel 42, and is defined by a second threaded body 444 with an interior thread formed thereon. The second threaded body 444 has a slot 448 defined therethrough. The slot 448 is generally rectangular, and is defined along a line perpendicular to an axis of the aperture 442. The first threaded body 422 functions to mate with the second threaded body 444 enabling relative movement between the lens barrel holder 44 and the lens barrel 42.

The focus adjusting mechanism 50 includes a driving member 52, a follower 54 and a transmission rod 56.

The driving member 52 (best shown in FIG. 2) includes a circular disk 522, a gear 524 and a rotary knob 526. The circular disk 522, the gear 524 and the rotary knob 526 may be assembled together, or, more preferably, may be formed integrally. The gear 524 includes a plurality of circumferential teeth 5242 formed thereon. The rotary knob 526 is coaxially located at an end of the gear 524, and the circular disk 522 is coaxially located at an opposite end of the gear 524. The circular disk 522 has a cylindrical hole 5222 defined therein. The cylindrical hole 5222 is coaxial to the circular disk 522, the gear 524 and the rotary knob 526, and is dimensioned so as to allow placing over the cylindrical column 34 of the lower shell portion 30 and then allow free rotation. The rotary knob 526 is a generally cylindrical body, and is dimensioned to pass through the through hole 24 of the upper shell portion 20.

The follower 54 (best shown in FIG. 2) is generally L-shaped, and includes a first plate 542 and a second plate 544. The second plate 544 is extended from an end of the first plate 542. The first plate 542 has a guide groove 546 defined therein, and the guide groove 546 is located in parallel with an end wall 5422 of the first plate 542. The end wall 5422 has a rack 547 formed thereon. The rack 547 includes a plurality of linear teeth 5472, the linear teeth 5472 are dimensioned so as to engage with the circumferential teeth 5242 of gear 524 of the driving member 52. The second plate 544 has a through groove 548 defined therethrough. The through groove 548 is generally arcuate, and is located perpendicular to the guide groove 546.

The transmission rod 56 (best shown in FIGS. 2, 4 and 5) is generally L-shaped, and includes a stepped portion 562, a connecting rod 564 and a protrusion 566. The stepped portion 562 extends transversely from an end of the connecting rod 564, and the protrusion 566 is protrudes from an opposite end of the connecting rod 564. The stepped portion 562 is elastic, and has an essentially identical shape and size to that of the stepped groove 426 of the lens barrel 42. The connecting rod 564 is dimensioned to pass through the sliding groove 448 of the lens barrel holder 44. The protrusion 566 is dimensioned to rotate within the through groove 548 of the follower 54.

Figure 6:
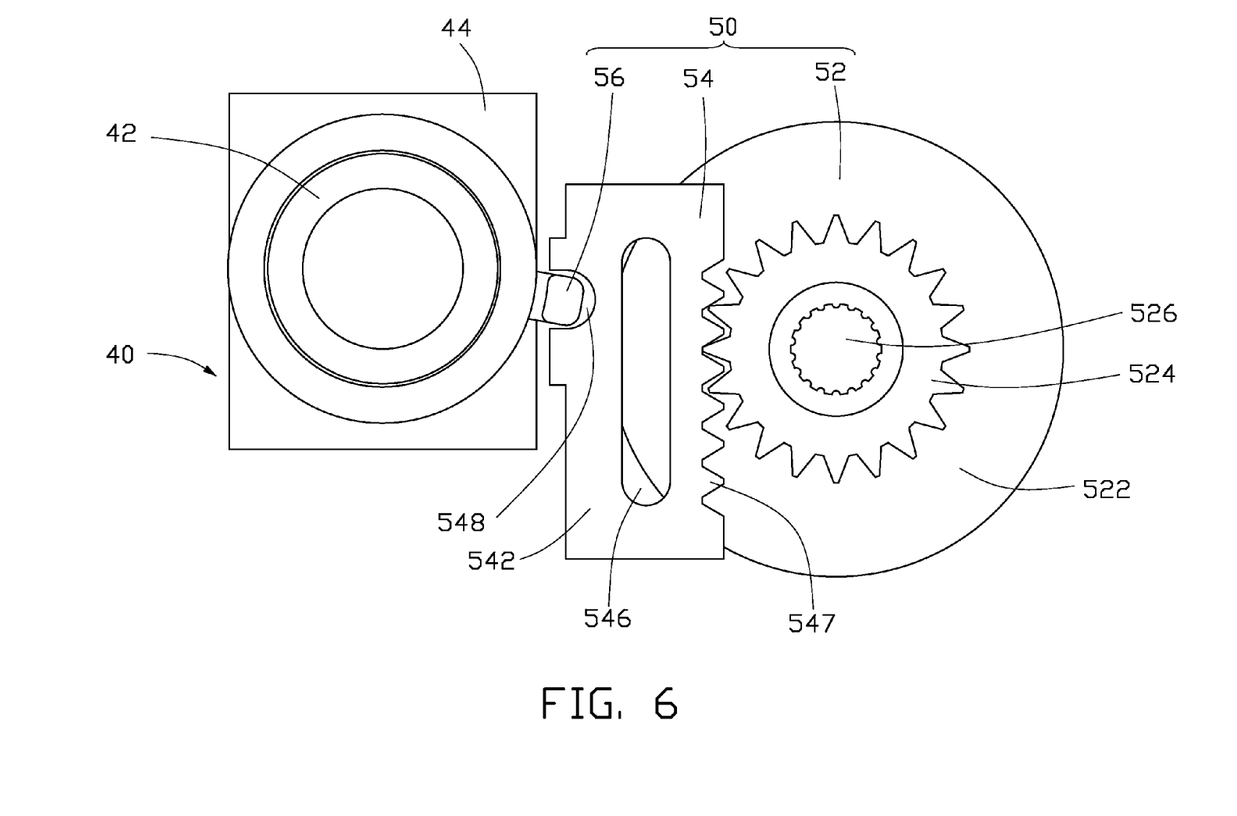
FIG. 6 is a top assembled view of the lens module, the transmission rod, a follower and a driving member shown in FIG. 2.

In assembly of the digital camera 200, referring also to FIG. 6, the threaded lens barrel 42 is threaded into the aperture of the lens barrel holder 44. The lens barrel 42 arrives at a place where the stepped groove 426 of the lens barrel 42 is aligned with the sliding groove 448 of the lens barrel holder 44. The transmission rod 56 extends through the sliding groove 448, while the stepped portion 562 of the transmission rod 56 is pushed into the stepped groove 426 of the lens barrel 42. In this case, the stepped portion 562 is locked into the lens barrel 42 in a latched state, and the protrusion 566 of the transmission rod 56 is exposed to the outside. The lens module 40 is glued to the positioning block 36 by facing the transmission rod 56 with the cylindrical column 34 of the lower shell portion 30. The driving member 52 is placed over the cylindrical column 34 with cylindrical column 34 engaging into the cylindrical hole 5222 of the driving member 52. The follower 54 is connected with the driving member 52 and the transmission rod 56. In this case, the rack 547 of the follower 54 is engaged with the gear 524, and the protrusion 566 of the transmission rod 56 is engaged into the through groove 548 of the follower 54. The upper shell portion 20 is securely connected with the lower shell portion 30. In this case, the rotary knob 526 of the driving member 52 and an end of the lens barrel 42 respectively protrude out from the through hole 24. The lens module 40 is secured in the receiving space 29 of the upper shell portion 20. The guide block 27 of the upper shell portion 20 is engaged in the guide groove 546 of the driving member 52.

In use of the digital camera 200, the position of the lens barrel 42 within the aperture of the lens barrel holder 44 may be adjusted thereby adjusting focal length of the lens module 40. When the rotary knob 526 of the driving member 52 is manually rotated, the gear 524 of the driving member 52 is rotated with the rotary knob 526 around the cylindrical column 34 of the lower shell portion 30. The follower 54 is urged by the gear 524 engaging with the rack 547 of the follower 54, and is then guided by the guide block 27 of the upper shell portion 20 to move linearly. The transmission rod 56 is subsequently urged to rotate around an axis of the lens barrel 42. In this case, the transmission rod 56 slides in the sliding groove 448, and the lens barrel 42 is threaded into or out of the lens barrel holder 44.

A main advantage of the focus adjusting mechanism 50 used in the digital camera 200 is that the focus adjusting mechanism 50 has a relatively long service-life while maintaining a precise focusing, and the focus adjusting mechanism 50 is easy to manipulate.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A focus adjusting mechanism for use in a portable electronic device with a lens module, the lens module comprising a lens barrel and a lens barrel holder, the lens barrel being threaded into the barrel holder, the focus adjusting mechanism comprising:
    a driving member, the driving member having a plurality of circumferential teeth formed thereon;
    a follower, the follower having a plurality of linear teeth formed thereon, the linear teeth meshing with the circumferential teeth to transform a rotation of the driving member to a linear movement of the follower; and
    a transmission rod, the transmission rod being disposed between the follower and the lens barrel to transform the linear movement of the follower into a rotation of the lens barrel relative to the lens barrel holder;
    wherein the transmission rod comprises a stepped portion, the lens barrel comprises a threaded body, the threaded body having a stepped groove defined therein, the stepped portion being securely held in the stepped groove
    wherein the transmission rod further comprises a protrusion, the follower further comprises a through groove, the protrusion being formed opposite to the steeped portion, the through groove being defined opposite to the linear teeth, the protrusion engaging in the through groove.

2. The focus adjusting mechanism as claimed in claim 1, wherein the driving member comprises a gear, the follower comprises a rack, the circumferential teeth being formed on the gear, the linear teeth being formed on the rack.

3. The focus adjusting mechanism as claimed in claim 2, wherein the driving member further comprises a rotary knob and a disk, the gear being disposed between the rotary knob and the disk, the disk having a hole defined therein configured for rotatably receiving a column of the portable electronic device therein to rotatably connect the driving member to the portable electronic device.

4. The focus adjusting mechanism as claimed in claim 1, wherein the transmission rod further comprises a connecting rod, the lens barrel holder has a sliding groove defined therethrough, the connecting rod being disposed between the protrusion and the stepped portion, the connecting rod being received in the sliding groove.

5. The focus adjusting mechanism as claimed in claim 4, wherein the follower further comprises a guide groove, the guide groove being defined between the rack and the sliding groove and configured to receive a guiding block of the portable electronic device for guiding linear movement of the follower.

6. The focus adjusting mechanism as claimed in claim 1, wherein the transmission rod and the follower are formed integrally.

7. The focus adjusting mechanism as claimed in claim 6, wherein the transmission rod further comprises a stepped portion, the lens barrel has a stepped groove defined therein, the stepped portion being dimensioned to be received in the stepped groove of the lens barrel, and being dimensioned to be rotatable with the lens barrel around an axis of the lens barrel.

8. The focus adjusting mechanism as claimed in claim 1, wherein the transmission rod and the lens barrel are formed integrally.

9. A portable electronic device, comprising:
    a lens module, the lens module comprising a lens barrel and a lens barrel holder, the lens barrel being threaded into the barrel holder;
    a focus adjusting mechanism, the focus adjusting mechanism comprising a driving member being rotatable, a follower being linearly moveable and a transmission rod, the driving member having a plurality of circumferential teeth formed thereon, the follower having a plurality of linear teeth formed thereon, the linear teeth meshing with the circumferential teeth to transform a rotation of the driving member to a linear movement of the follower, the transmission rod being disposed between the follower and the lens barrel to transform the linear movement of the follower into a rotation of the lens barrel relative to the lens barrel holder;
    an upper shell portion; and
    a lower shell portion being attached to the upper shell portion to enclose the focusing mechanism and the lens module;
    wherein the driving member comprises a gear, the follower comprises a rack, the radical teeth being formed on the gear, the linear teeth being formed on the rack; and
    wherein the upper shell portion defines a light-guiding hole, and has a semienclosed wall formed around the light-guiding hole, the semienclosed wall defining a receiving space, the lens module being received in the receiving space with the lens barrel aligned with the light-guiding hole.

10. The portable electronic device as claimed in claim 9, wherein the driving member further comprises a rotary knob and a disk, the upper shell portion defines a through hole, the lower shell portion forms a column, the gear being disposed between the rotary knob and the disk, the disk having a bole rotatably receiving the column therein, the knob being exposed through the through hole.

11. The portable electronic device as claimed in claim 9, wherein the follower defines a guide groove, the upper shell portion forms a guide block, the guide block being engaged into the guide groove.

12. The portable electronic device as claimed in claim 9, wherein the lower shell portion forms a positioning block, the lens holder being attached to the positioning block.

13. The portable electronic device as claimed in claim 9, wherein the upper shell portion has a through hole, a light-guiding hole defined therethrough, and has a guide block and a semienclosed wall with an open end formed thereon, the guide block being located between the through hole and the light-guiding hole and being received in a guide groove defined in the follower for guiding movement of the follower, the open end facing the guide block, the lens module being surrounded by the semienclosed wall.

14. A portable electronic device comprising:
    a lower shell portion;
    an upper shell portion covered to the lower shell portion to form an enclosed space, the upper shell portion defining a through hole and a light-guiding hole;
    a lens module accommodated within the space, the lens module comprising a lens barrel holder and a lens barrel being threaded into the barrel holder; and a focus adjusting mechanism accommodated within the space, the focus adjusting mechanism comprising a driving member rotatably secured within the space, a follower meshing with the driving member and engaging with a transmission rod, the driving member comprising a rotary knob extending out of the through hole of the upper shell portion, the transmission rod engaging with the lens barrel;

wherein the rotary knob is manipulatable to rotate the driving member and the follower and the transmission rod in turn transfer rotation of the driving member to the lens barrel to drive the lens barrel to rotate relative to the lens barrel holder, thereby adjusting a focal length of the lens barrel;

wherein the driving member comprises a plurality of circumferential teeth formed on a circumferential surface thereof, the follower comprises a plurality of linear teeth formed thereon, the linear teeth meshed with the circumferential teeth for transferring rotation of the driving member to linear movement of the follower.

15. The portable electronic device as claimed in claim 14, wherein the lens barrel holder defines a slot in the linear movement direction of the follower, an end of the transmission rod is fixed with the follower and is moveable with the follower, an opposite end of the transmission rod extends through the slot of the lens barrel holder to engage with the lens barrel for driving the lens barrel to rotate relative to the lens barrel holder when the rotary knob is manipulated.

* * * * *